(12) United States Patent
Cheng

(10) Patent No.: US 9,504,357 B2
(45) Date of Patent: Nov. 29, 2016

(54) INSULATING POT BOTTOM FOR STOCKPOTS

(71) Applicants: Chung-Yen Cheng, Taichung (TW); Chun-Hong Liu, New Taipei (TW)

(72) Inventor: Chung-Yen Cheng, Taichung (TW)

(73) Assignees: Chung-Yen Cheng, Taichung (TW); Chun-Hong Liu, New Taipei (TW)

( * ) Notice: Subject to any disclaimer, the term of this patent is extended or adjusted under 35 U.S.C. 154(b) by 0 days.

(21) Appl. No.: 15/054,202

(22) Filed: Feb. 26, 2016

(65) Prior Publication Data

US 2016/0262572 A1 Sep. 15, 2016

(30) Foreign Application Priority Data

Mar. 11, 2015 (TW) .............................. 104203644 U

(51) Int. Cl.
*F27D 11/00* (2006.01)
*A47J 41/00* (2006.01)
*A47J 36/34* (2006.01)

(52) U.S. Cl.
CPC ............. *A47J 41/0055* (2013.01); *A47J 36/34* (2013.01)

(58) Field of Classification Search
CPC ..................................................... A47J 27/004
USPC ........... 248/671, 678, 311.2, 346.01, 346.03, 248/346.07, 346.4, 346.5; 220/592.26, 220/592.24, 592.23, 592.2; 219/429, 430, 219/432
See application file for complete search history.

(56) References Cited

U.S. PATENT DOCUMENTS

| | | | | |
|---|---|---|---|---|
| 274,461 A | * | 3/1883 | Chalk ................... | F25D 23/062 220/212.5 |
| 2,575,299 A | * | 11/1951 | Scheel ................... | A45C 11/20 126/261 |
| 3,270,740 A | * | 9/1966 | Koos, Jr. ................ | A47J 37/01 126/275 R |
| 3,695,483 A | * | 10/1972 | Pogorski ............ | B65D 81/3811 138/149 |
| 4,320,736 A | * | 3/1982 | Sharon .................... | F24B 1/003 126/19 M |
| 4,445,495 A | * | 5/1984 | Frost ........................ | F24C 3/14 114/191 |
| 5,183,995 A | * | 2/1993 | Addison ................ | H05B 3/683 126/214 D |
| 5,431,091 A | * | 7/1995 | Couture .............. | A47J 37/0605 126/275 R |
| 6,593,550 B1 | * | 7/2003 | Royer ..................... | A47J 36/34 126/24 |
| 9,016,653 B1 | * | 4/2015 | Cox, Jr. ............. | B65D 19/0002 248/346.01 |
| 2007/0089753 A1 | * | 4/2007 | Faries, Jr. .............. | A61B 46/10 128/849 |
| 2007/0181767 A1 | * | 8/2007 | Wobben .................. | E02D 27/42 248/346.01 |
| 2009/0145912 A1 | * | 6/2009 | Hyde ................. | B65D 81/3802 220/592.26 |
| 2010/0051628 A1 | * | 3/2010 | Fang ....................... | A47J 36/36 220/592.24 |
| 2010/0258268 A1 | * | 10/2010 | Li ......................... | F25D 31/007 165/64 |

* cited by examiner

*Primary Examiner* — Terrell McKinnon
*Assistant Examiner* — Michael McDuffie
(74) *Attorney, Agent, or Firm* — Alan D. Kamrath; Kamrath IP Lawfirm, P.A.

(57) ABSTRACT

An insulating pot bottom for stockpots has a connecting base, a flame guiding block, and multiple insulating mounts. The connecting base has a bottom panel, an inlet hole, and multiple abutting ribs. The inlet hole is formed through the bottom panel. The abutting ribs are formed on and protrude from the bottom panel at spaced intervals around the inlet hole, and each one of the abutting ribs has at least one protrusion. The flame guiding block is mounted in the inlet hole of the connecting base and abuts the protrusions of the abutting ribs. The insulating mounts are mounted on the connecting base, and respectively abut the abutting ribs around the flame guiding block.

28 Claims, 12 Drawing Sheets

INSULATING POT BOTTOM FOR STOCKPOTS

BACKGROUND OF THE INVENTION

1. Field of the Invention

The present invention relates to a pot bottom, and more particularly to an insulating pot bottom for stockpots that may improve the heating efficiency of the stockpots and may provide a heat insulation effect to cooked food for a prolonged time.

2. Description of Related Art

With reference to FIG. 12, a conventional stockpot 50 is used to contain water or food and is put on a heating stove 60 to cook the water or food. As a bottom of the conventional stockpot 50 is flat and cannot keep heat in the conventional stockpot 50, this will affect the heating efficiency of the conventional stockpot 50 and increase the heating time for cooking food. When the heating stove 60 is stopped from heating the conventional stockpot 50, the heat in the bottom of the conventional stockpot 50 will dissipate easily. Then, the cooked food cannot be kept in heat-insulation in the conventional stockpot.

To overcome the shortcomings, the present invention provides an insulating pot bottom for stockpots to mitigate or obviate the aforementioned problems.

SUMMARY OF THE INVENTION

The main objective of the present invention is to provide an insulating pot bottom for stockpots that may improve the heating efficiency of the stockpots and provide a heat insulation effect to cooked food for a prolonged time.

The insulating pot bottom for stockpots in accordance with the present invention has a connecting base, a flame guiding block, and multiple insulating mounts. The connecting base has a bottom panel, an inlet hole, and multiple abutting ribs. The inlet hole is formed through the bottom panel. The abutting ribs are formed on and protrude from the bottom panel at spaced intervals around the inlet hole, and each one of the abutting ribs has at least one protrusion. The flame guiding block is mounted in the inlet hole of the connecting base and abuts the protrusions of the abutting ribs. The insulating mounts are mounted on the connecting base, and respectively abut the abutting ribs around the flame guiding block.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 6, a first embodiment of an insulating pot bottom in accordance with the present invention is mounted in a first kind of stockpot to improve the heating efficiency of the stockpot and provide a heat insulation effect to cooked food for a prolonged time. The first kind of stockpot has an outer pot 10 and an inner pot 20.

Figure 1:
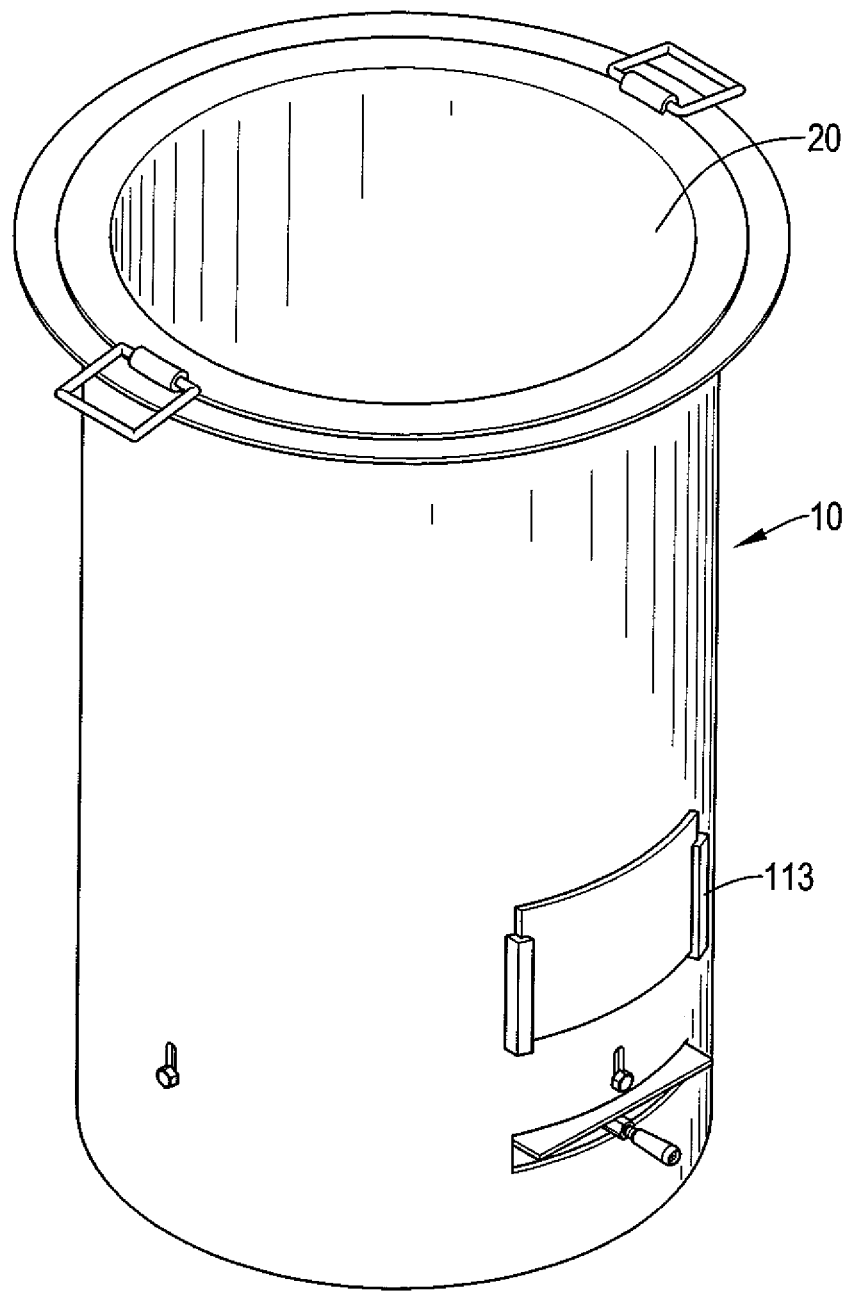
FIG. 1 is a perspective view of a first embodiment of an insulating pot bottom in accordance with the present invention, mounted in a first kind of stockpot.
Figure 2:
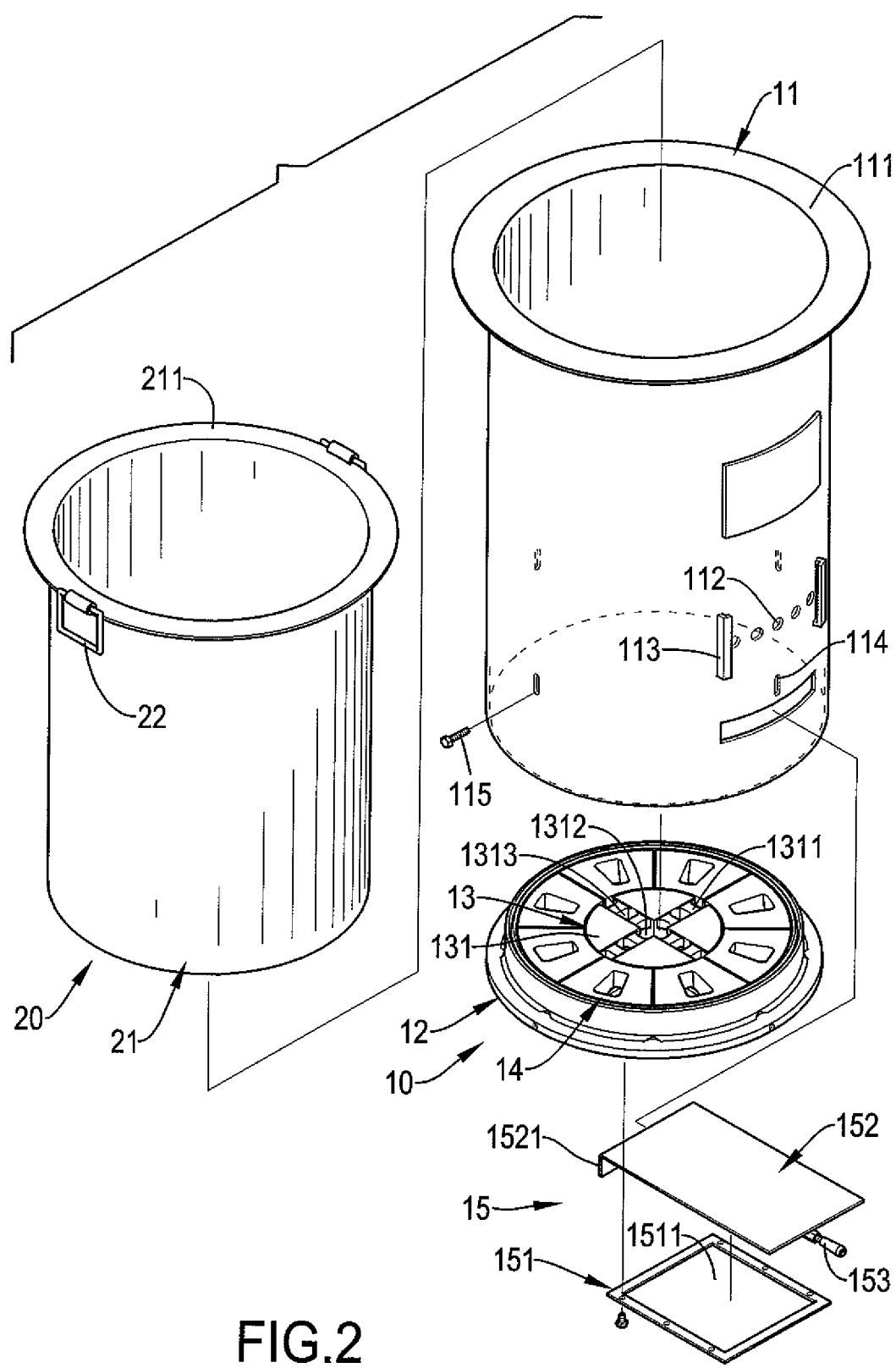
FIG. 2 is an exploded perspective view of the insulating pot bottom in FIG. 1.

With reference to FIGS. 1 and 2, the outer pot 10 has an outer pot body 11. The outer pot body 11 is a hollow cylinder and has a top, a bottom, an external surface, an upper opening, a lower opening, a holding flange 111, multiple venting holes 112, an outer sluice gate 113, and multiple fixing holes 114. The upper opening is formed through the top of the outer pot body 11. The lower opening is formed through the bottom of the outer pot body 11 and communicates with the upper opening of the outer pot body 11. The holding flange 111 is annularly formed on and protrudes radially from the external surface of the outer pot body 11 around the upper opening of the outer pot body 11.

The venting holes 112 are formed through the external surface of the outer pot body 11 at spaced intervals and are arranged horizontally. The outer sluice gate 113 is movably mounted on the external surface of the outer pot body 11 to selectively cover the venting holes 112. In addition, the outer sluice gate 113 may be moved longitudinally relative to the outer pot body 11. The fixing holes 114 are elongated and are formed through the external surface of the outer pot body 11 at spaced intervals around the outer pot body 11 between the outer sluice gate 113 and the lower opening of the outer pot body 11. The outer pot body 11 has multiple positioning elements 115 respectively mounted in the fixing holes 114. Furthermore, each one of the positioning elements 115 may be a bolt.

The inner pot 20 is mounted in the outer pot 10 via the upper opening of the outer pot body 11 and has an inner pot body 21, a pair of handles 22, and an inner pot bottom 23.

The inner pot body 21 is hollow, is mounted in the outer pot body 11, and has an open top, an open bottom, an external surface, and an abutting ring 211. The abutting ring 211 is radially formed on and protrudes from the external surface of the inner pot body 21 at the open top of the inner pot body 21 and abuts against the holding flange 111 of the outer pot body 11 to hold the inner pot body 21 securely with the outer pot body 11 and to form an annular gap between the pot bodies 11, 21. The pair of handles 22 is securely mounted on the abutting ring 211 of the inner pot body 21 to enable the user to move the inner pot body 21 relative to the outer pot body 11.

The inner pot bottom 23 is securely connected to the inner pot body 21 to close the open bottom of the inner pot body 21 and has an upper side, a bottom side, multiple heating stands 231, and multiple heating spaces 232. The heating stands 231 are formed on and protrude upwardly from the upper side of the inner pot bottom 23 at spaced intervals. Furthermore, each one of the heating stands 231 may be hollow and rectangular. The heating spaces 232 are formed in the bottom side of the inner pot bottom 23 between the heating stands 231 and communicate with the annular gap between the pot bodies 11, 21.

Figure 3:
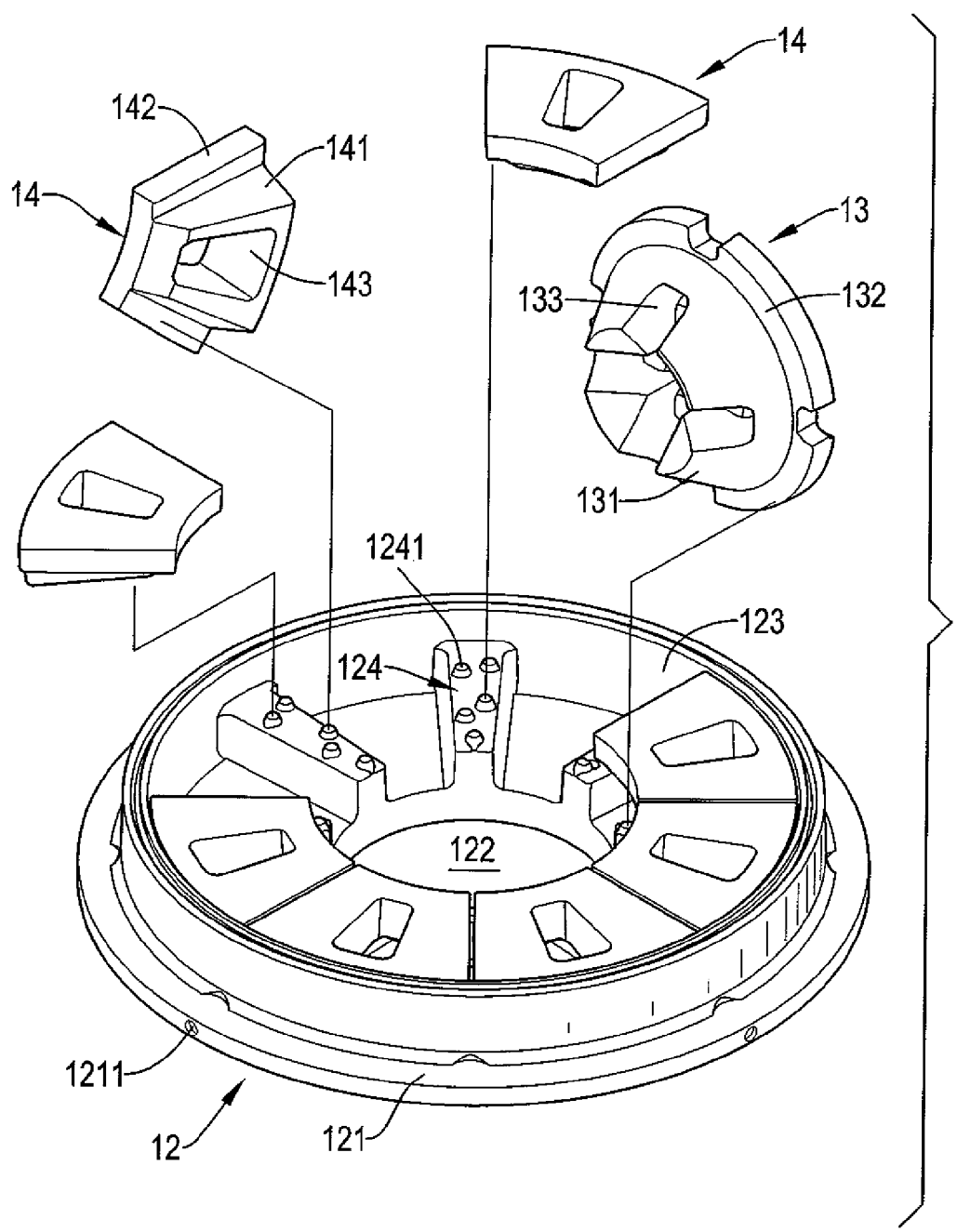
FIG. 3 is an enlarged and exploded perspective view of the insulating pot bottom in FIG. 2.
Figure 4:
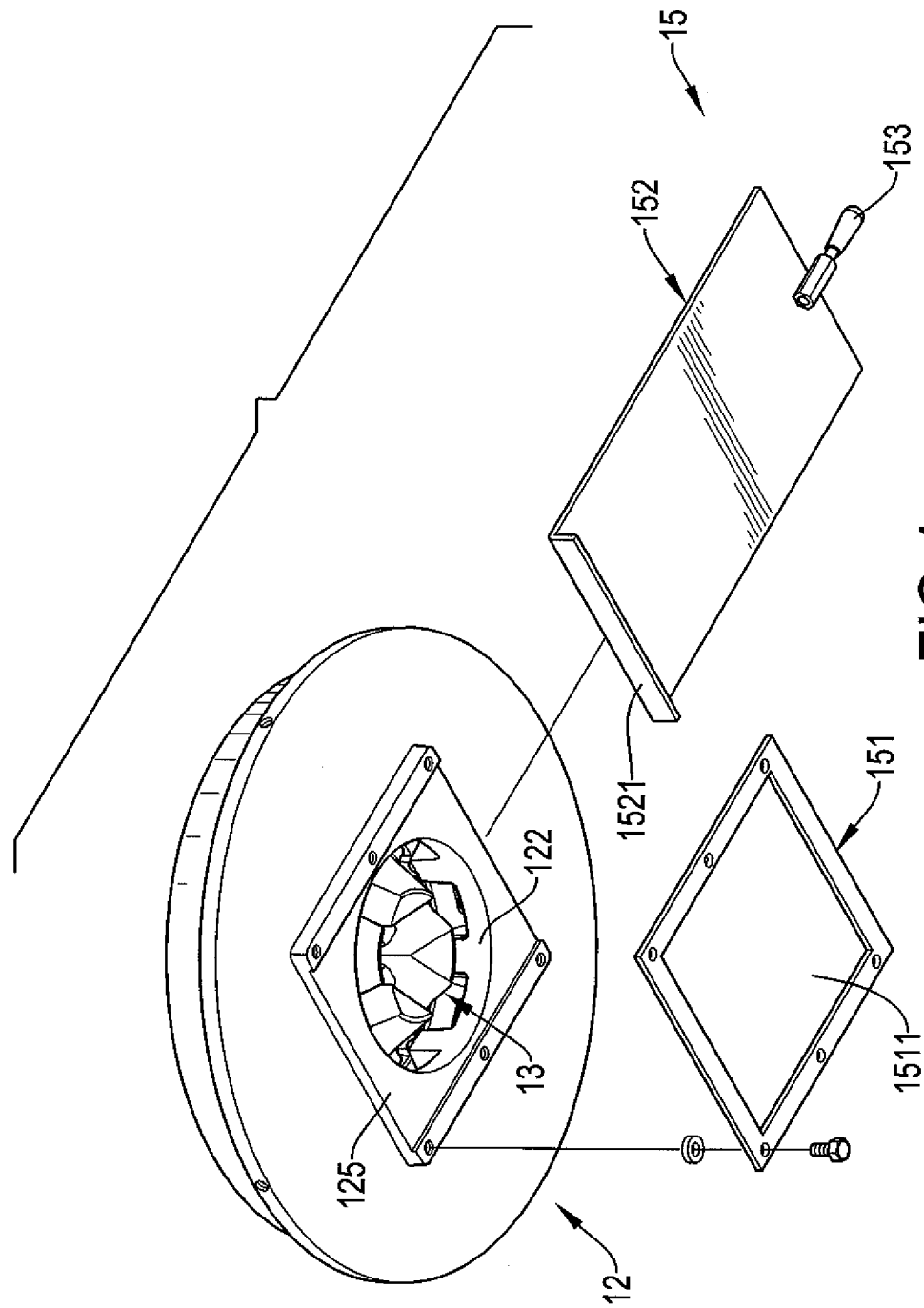
FIG. 4 is another enlarged and exploded perspective view of the insulating pot bottom in FIG. 2.
Figure 5:
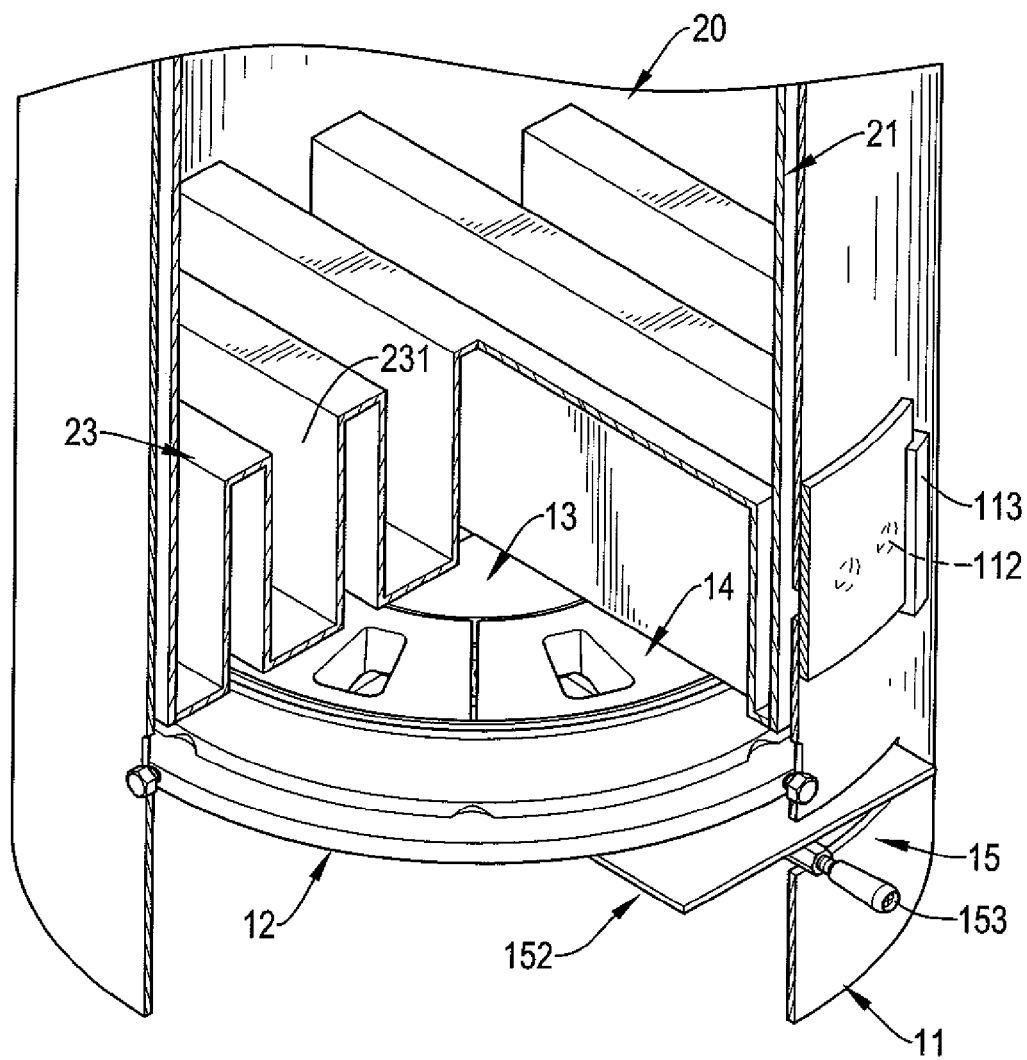
FIG. 5 is a partial cross-sectional perspective view of the insulating pot bottom in FIG. 1, mounted in the first kind of stockpot.
Figure 6:
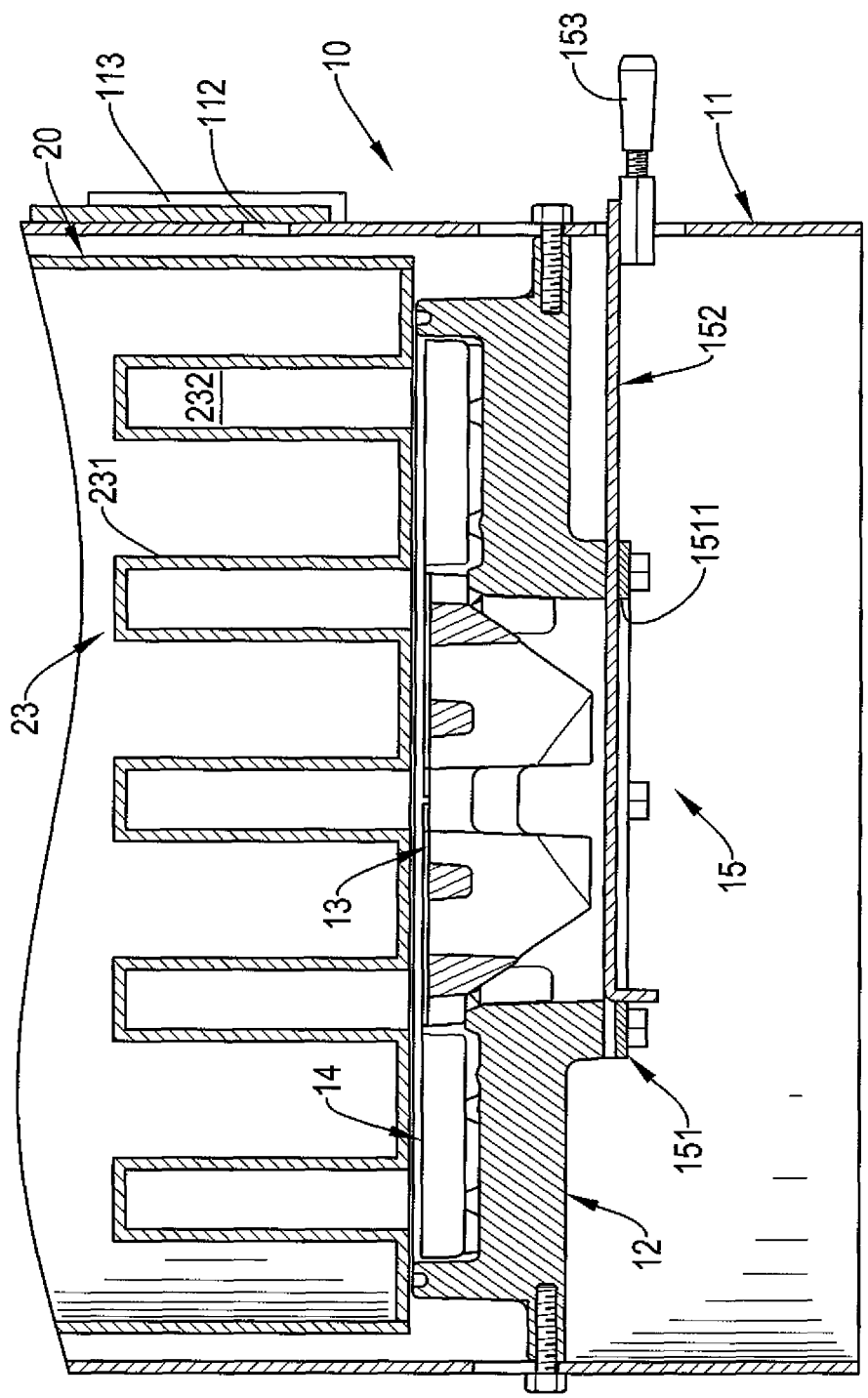
FIG. 6 is an enlarged side view of the insulating pot bottom in FIG. 1, mounted in the first kind of stockpot.

With reference to FIGS. 2 to 4, the first embodiment of the insulating pot bottom is mounted in the outer pot body 11 near the lower opening of the outer pot body 11 and has a connecting base 12, a flame guiding block 13, multiple insulating mounts 14, and a bottom sluice gate 15.

The connecting base 12 is mounted in the outer pot body 11 and has a bottom panel 121, an inlet hole 122, an annular wall 123, multiple abutting ribs 124, and a sliding groove 125. The bottom panel 121 is round, is securely connected to the outer pot body 11, and has a center, an outer periphery, a top surface, and multiple threaded holes 1211. The threaded holes 1211 are formed in the outer periphery of the bottom panel 121 and respectively align with the fixing holes 114 of the outer pot body 11 to enable the positioning elements 115 to respectively and securely connect to the threaded holes 1211. Then, the bottom panel 121 is securely connected to the outer pot body 11. The inlet hole 122 is formed through the center of the bottom panel 121.

The annular wall 123 is formed on and protrudes upwardly from the top surface of the bottom panel 121 around the inlet hole 122 and has an inner surface and a height. The abutting ribs 124 are formed on and protrude from the top surface of the bottom panel 121 at spaced intervals around the inlet hole 122 and are connected to the inner surface of the annular wall 123. Each one of the abutting ribs 124 is elongated and has a height, a top side, and multiple protrusions 1241. The heights of the abutting ribs 124 are lower than the height of the annular wall 123. The protrusions 1241 are formed on and protrude from the top side of the abutting rib 124 at spaced intervals. In addition, the insulating pot bottom has eight abutting ribs 124 formed on and protruding from the top surface of the bottom panel 121 at spaced intervals. Furthermore, each one of the abutting ribs 124 has five protrusions 1241, and the five protrusions 1241 are staggered on the top side of the abutting rib 124. The sliding groove 125 is transversally formed in a bottom of the connecting base 12 and communicates with the inlet hole 122.

The flame guiding block 13 is mounted in the inlet hole 122 of the connecting base 12, abuts the abutting ribs 124, and has a conducting segment 131, an abutting flange 132, and multiple notches 133. The conducting segment 131 may be tapered, is mounted in the inlet hole 122 of the connecting base 12, and has a flat top, a bottom, an external surface, a guiding slot 1311, a through hole 1312, and multiple guiding holes 1313. The guiding slot 1311 is crisscross-shaped, is formed through the flat top of the conducting segment 131, and has a center. The through hole 1312 is formed through the center of the guiding slot 1311 and communicates with the inlet hole 122. The guiding holes 1313 are formed through the conducting segment 131 and communicate with the guiding slot 1311.

The abutting flange 132 is formed on and radially protrudes from the external surface of the conducting segment 131 around the flat top of the conducting segment 131 and abuts the protrusions 1241 of the abutting ribs 124 near the inlet hole 122. The notches 133 are formed through the external surface of the conducting segment 131 at spaced intervals and communicate with the guiding slot 1311 via the guiding holes 1313.

The insulating mounts 14 may be fan-shaped, are mounted on the connecting base 12, and respectively abut the abutting ribs 124 around the flame guiding block 13. Each one of the insulating mounts 14 has a heating segment 141, two abutting flanges 142, and a conducting hole 143. The heating segment 141 may be fan-shaped, is mounted in the connecting base 12 between two adjacent abutting ribs 124, and has a top, a bottom, and two opposite sides. The opposite sides of the heating segment 141 respectively face the two adjacent abutting ribs 124. The two abutting flanges 142 are respectively formed on and transversally protrude from the two opposite sides of the heating segment 141 at the top of the heating segment 141 and respectively abut the protrusions 1241 of the two adjacent abutting ribs 124. The conducting hole 143 is formed through the top and the bottom of the heating segment 141. Additionally, the insulating pot bottom has eight insulating mounts 14 mounted on the connecting base 12 at spaced intervals, and each insulating mount 14 abuts two adjacent abutting ribs 124.

With reference to FIGS. 1, 2, and 4, the bottom sluice gate 15 is connected to the outer pot body 11 and has a bottom frame 151, a gate panel 152, and an operating stem 153. The bottom frame 151 is securely connected to the bottom of the connecting base 12 below the sliding groove 125 and has a gate hole 1511. The gate hole 1511 is formed through the bottom frame 151 and is disposed around the inlet hole 122 of the connecting base 12.

The gate panel 152 is movably mounted in the sliding groove 125 between the inlet hole 122 and the bottom frame 151 and has an inner edge, an outer edge, and a limiting tab 1521. The inner edge of the gate panel 152 is mounted in the sliding groove 125. The outer edge of the gate panel 152 extends out of the outer pot body 11. The limiting tab 1521 is formed on and protrudes downwardly from the inner edge of the gate panel 152 and extends in the gate hole 1511 of the bottom frame 151 to prevent the gate panel 152 separating from the bottom frame 151. The operating stem 153 is securely connected to the gate panel 152 near the outer edge of the gate panel 152 and extends out of the outer pot body 11. A user can pull or push the operating stem 153 to move the gate panel 152 to adjust an opening range of the inlet hole 122.

Figure 7:
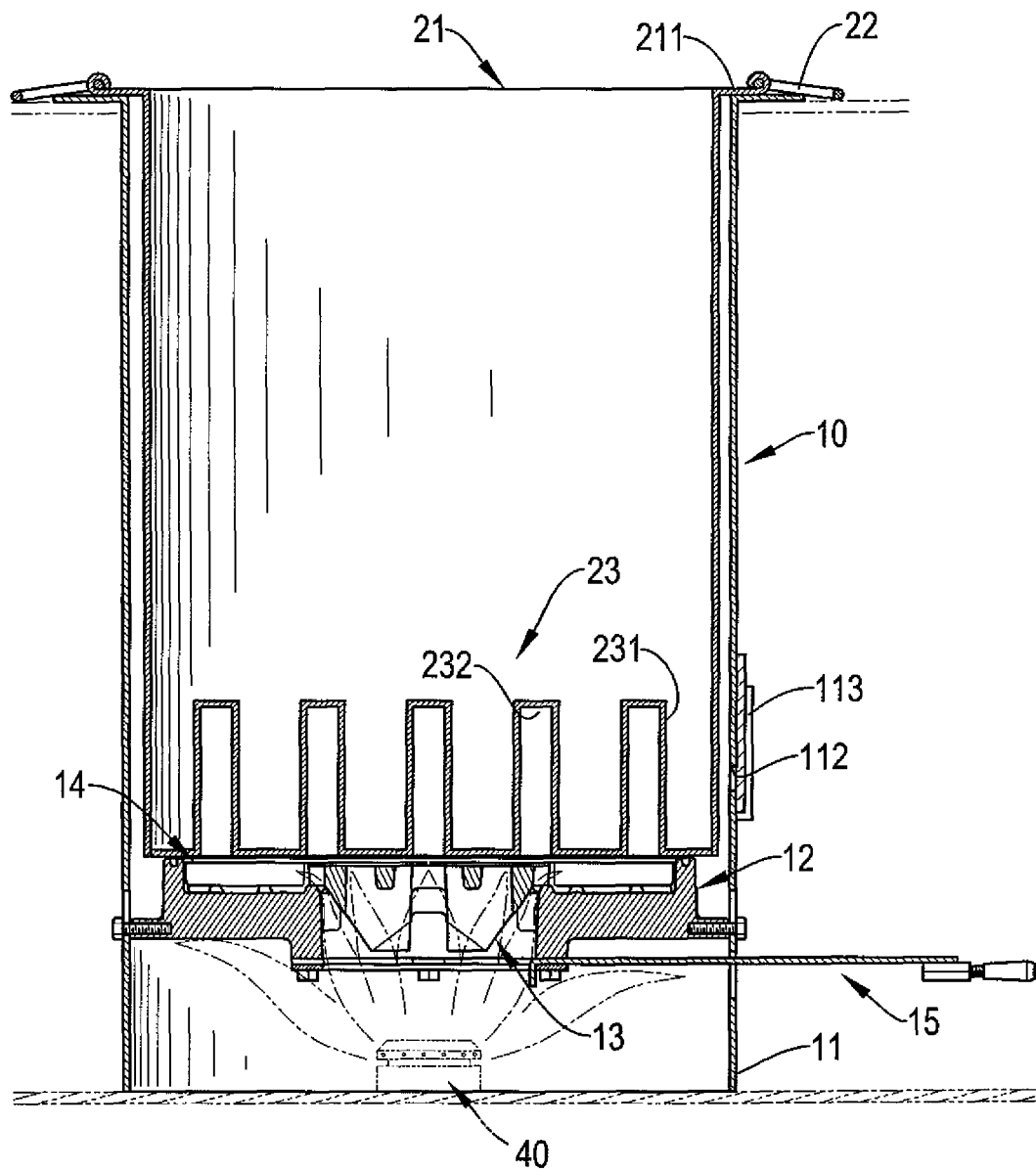
FIG. 7 is an operational side view of the insulating pot bottom in FIG. 1, mounted in the first kind of stockpot and placed on a heating stove.
Figure 8:
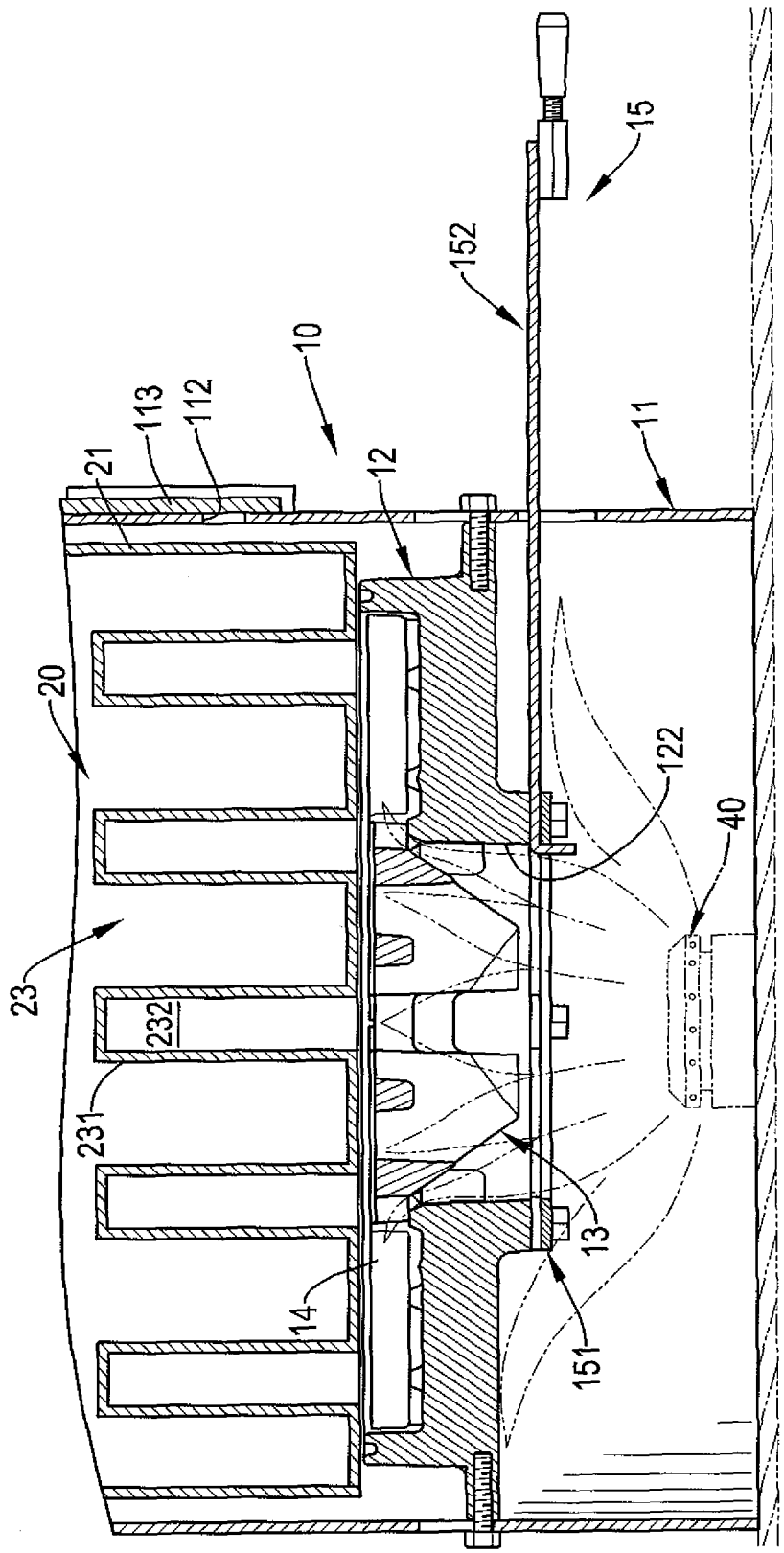
FIG. 8 is an enlarged operational side view of the insulating pot bottom in FIG. 7, mounted in the first kind of stockpot and placed on the heating stove.

In use, with reference to FIGS. 7 and 8, food is put in the inner pot 20 and the inner pot 20 is mounted in the outer pot 10. Then, the outer pot 10 is placed on a heating stove 40 for the heating stove 40 to directly heat the insulating pot bottom of the outer pot 10. During the heating process, the flame of the heating stove 40 can heat the flame guiding block 13 via the connecting base 12 and can heat the insulating mounts 14 via the flame guiding block 13. Then, the insulating mounts 14 can be heated by the heating stove 40 to improve the heating efficiency of the heating stove 40. Furthermore, heat flow generated during the heating process can flow into the heating spaces 232 of the inner pot bottom 23 and the annular gap between the pot bodies 11, 21 to heat the inner pot 20 uniformly to cook the food.

When the heating stove 40 is turned off, the user can respectively close the venting holes 112 and the inlet hole 122 with the outer sluice gate 113 and the bottom sluice gate 15 such that the outer pot 10 is in a closed condition. The heat flow will not flow out of the outer pot 10, thereby avoiding lowering the temperature of the inner pot 20 and raising the ambient temperature. Additionally, the insulating pot bottom of the outer pot 10 has a larger volume to absorb more heat than the conventional stockpot 50. Consequently, the stockpot of the present invention can sustain a heat-insulation effect and continuously cook food for a prolonged long time even after the heating stove 40 stops heating the stockpot. In addition, because the heat cannot dissipate out of the outer pot 10 easily and the heating stove 40 only needs to heat the stockpot once for continuous heat-insulation and cooking of the food, the cost of using the heating stove 40 is reduced.

Figure 9:
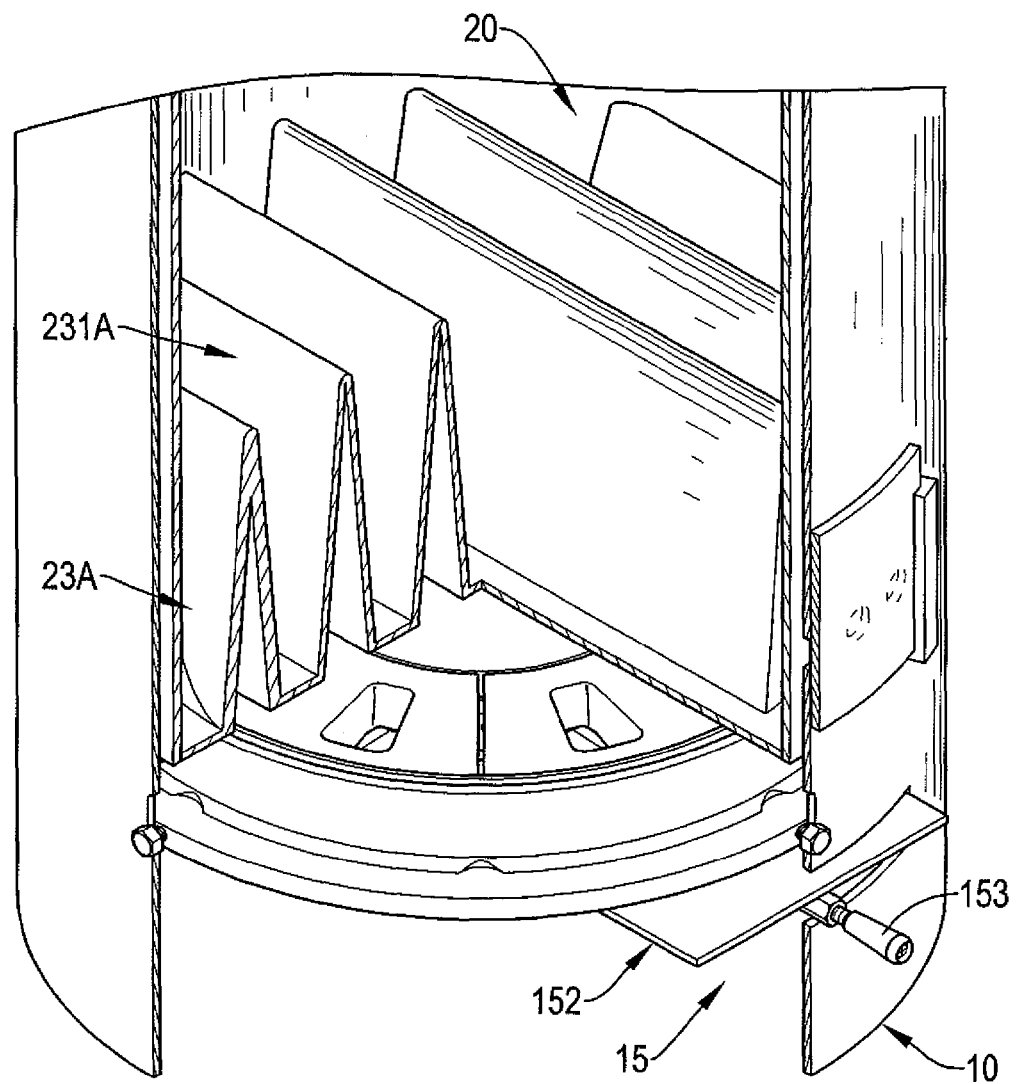
FIG. 9 is partial cross-sectional perspective view of the insulating pot bottom in FIG. 2, mounted in a second kind of stockpot.

With reference to FIG. 9, a second kind of stockpot in accordance with the present invention is substantially the same as the first kind of stockpot except for the following features. Each heating stand 231A of the inner pot bottom 23A is a triangular and hollow column.

Figure 10:
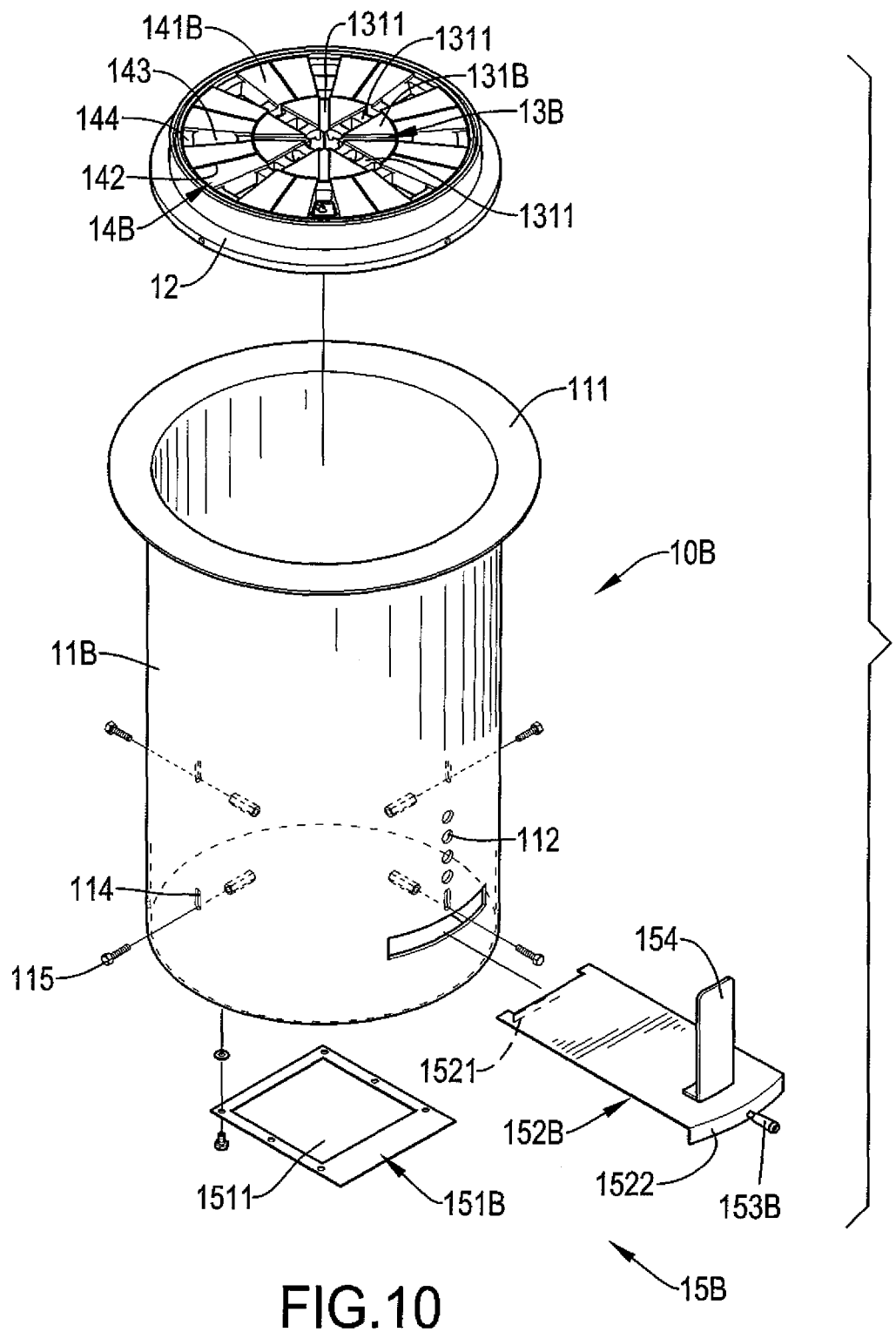
FIG. 10 is an exploded perspective view of a second embodiment of an insulating pot bottom in accordance with the present invention, mounted in a third kind of stockpot.
Figure 11:
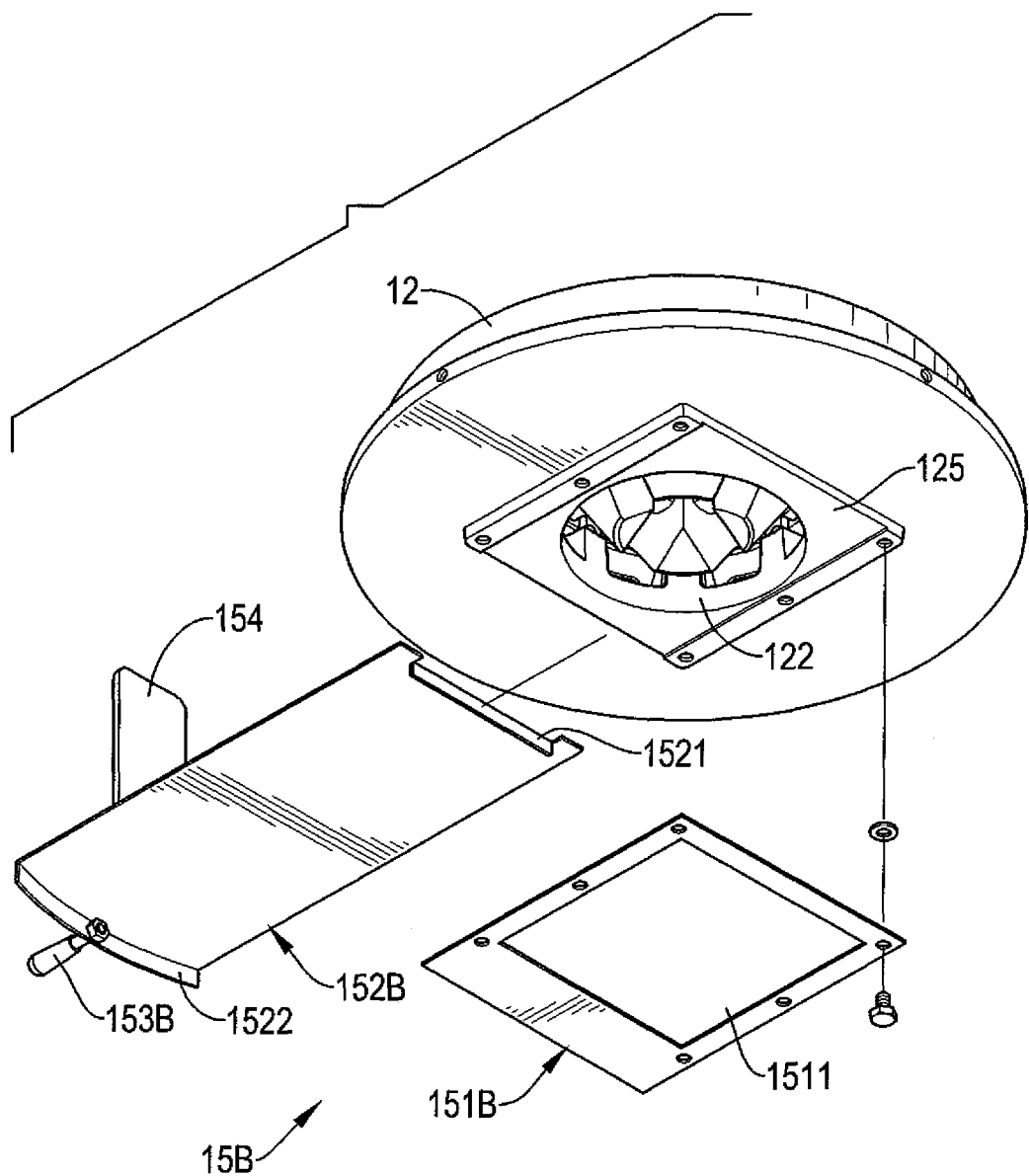
FIG. 11 is another exploded perspective view of the insulating pot bottom in FIG. 10.
Figure 12:
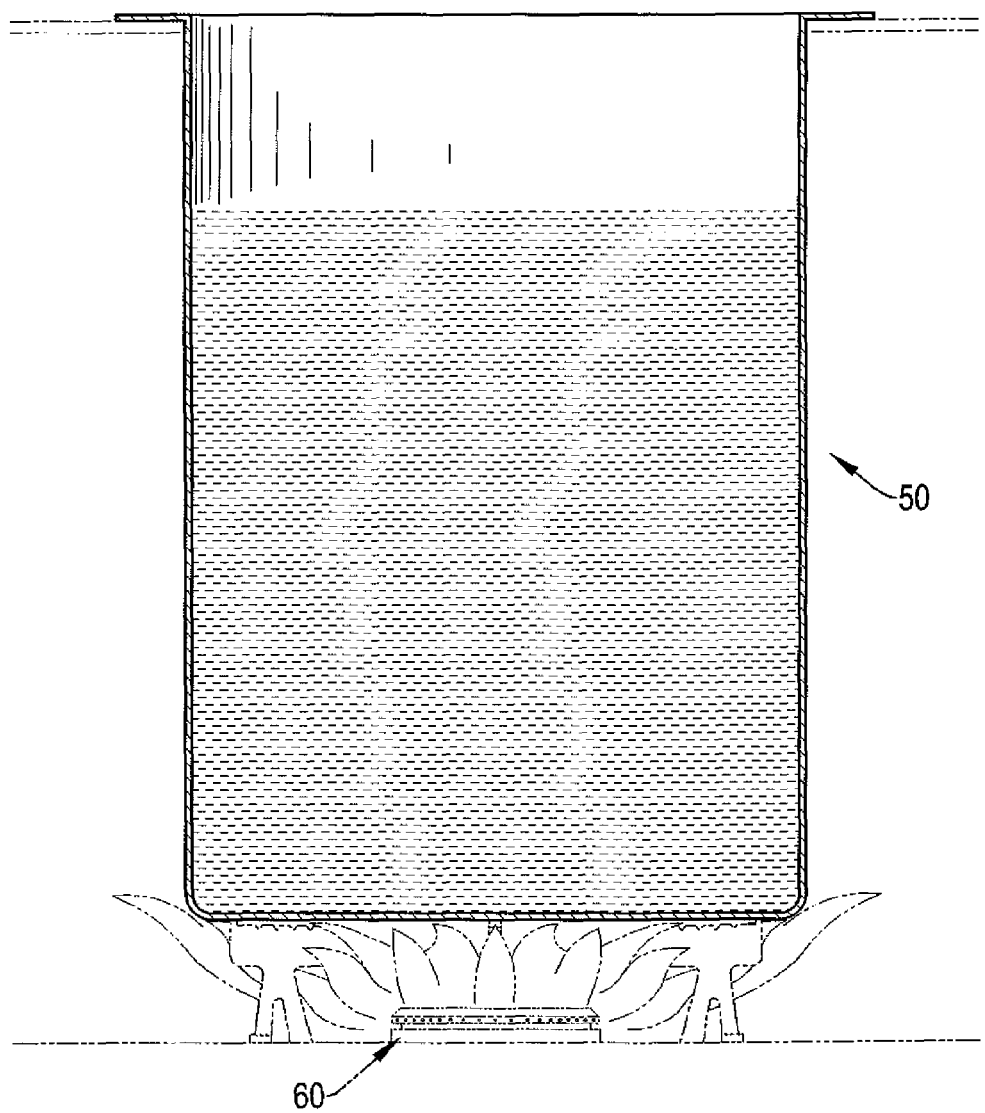
FIG. 12 is an operational side view of a stockpot in accordance with the prior art, placed on a heating stove.

With reference to FIGS. 10 and 11, a second embodiment of an insulating pot bottom in accordance with the present invention is mounted in a third kind of stockpot. The third kind of stockpot is substantially the same as the first kind of stockpot except for the following features. The outer pot 10B does not have the outer sluice gate 113. The venting holes 112 are formed through the external surface of the outer pot body 11B of the outer pot 10B at spaced intervals and are arranged longitudinally. Each positioning element 115 has a bolt and a nut. The bolt of the positioning element 115 is inserted into a corresponding fixing hole 114 from the external surface of the outer pot body 11B and is screwed with the nut of the positioning element 115.

The second embodiment of the insulating pot bottom in accordance with the present invention is mounted in the outer pot body 11B via the upper opening of the outer pot body 11B and abuts the nuts of the positioning elements 115. The guiding slot 1311 is star-shaped and is selectively formed through the flame guiding block 13B. Each insulating mount 14B has a guiding groove 144 formed in the top of the heating segment 141B of the insulating mount 14B and communicates with the conducting hole 143 and the guiding slot 1311. The bottom sluice gate 15B further has a connecting tab 1522 and a retaining board 154. The connecting tab 1522 is formed on and protrudes downwardly from the outer edge of the gate panel 152B, and the operating stem 153B is securely connected to the connecting tab 1522 of the bottom sluice gate 15B. The retaining board 154 is mounted on the gate panel 152B near the outer edge of the gate panel 152B to cover the venting holes 112 of the outer pot body 11B. When the gate panel 152B is moved relative to the sliding groove 125 to close the inlet hole 122, the retaining board 154 covers the venting holes 112 to close the outer pot 10B under one act of operation.

According to the above-mentioned statements, the stockpot as described has the following advantages.

1. The heat of the insulating pot bottom that is generated by the heating stove 40 can transfer heat to the inner pot 20 via conduction, convection or radiation to keep the inner pot 20 in a heated condition for a prolonged time. When the heating stove 40 is stopped from heating the insulting pot bottom of the outer pot 10, 10B, the insulting pot bottom can still remain at a specific high temperature, such that the heat will not easily dissipate away and can provide a continuous cooking effect to food.

2. The flame of the heating stove 40 can be guided by the flame guiding block 13, 13B and the heat can be concentrated on the insulating mounts 14, 14B to heat the inner pot 20 quickly and uniformly, and this can reduce the heating time and save the heating source.

3. The sluice gates 113, 15 can be used to close the outer pot 10, 10B into a closed condition after heating, and this can prevent the heat dissipating from the stockpot and raising the ambient temperature.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An insulating pot bottom for stockpots having:
   a connecting base having
      a bottom panel having a center and a top surface;
      an inlet hole formed through the center of the bottom panel; and
      multiple abutting ribs formed on and protruding from the top surface of the bottom panel at spaced intervals around the inlet hole, and each one of the abutting ribs having
         a top side; and
         at least one protrusion formed on and protruding from the top side of the abutting rib;
   a flame guiding block mounted in the inlet hole of the connecting base and abutting the protrusions of the abutting ribs; and
   multiple insulating mounts mounted on the connecting base, and respectively abutting the abutting ribs around the flame guiding block.

2. The insulating pot bottom as claimed in claim 1, wherein the flame guiding block has
   a conducting segment mounted in the inlet hole of the connecting base and having an external surface and a flat top;
   an abutting flange formed on and radially protruding from the external surface of the conducting segment around the flat top of the conducting segment and abutting the protrusions of the abutting ribs near the inlet hole; and
   multiple notches formed through the external surface of the conducting segment at spaced intervals.

3. The insulating pot bottom as claimed in claim 2, wherein each one of the insulating mounts has
   a heating segment mounted in the connecting base between two adjacent abutting ribs and having a top, a bottom, and two opposite sides;
   at least one abutting flange formed on and transversally protruding from one of the opposite sides of the heating segment at the top of the heating segment and respectively abutting the protrusions of the two adjacent abutting ribs; and
   a conducting hole formed through the top and the bottom of the heating segment.

4. The insulating pot bottom as claimed in claim 3, wherein each one of the insulating mounts has a guiding groove formed in the top of the heating segment of the insulating mount and communicating with the conducting hole of the insulating mount.

5. The insulating pot bottom as claimed in claim 4, wherein
   the connecting base has an annular wall formed on and protruding upwardly from the top surface of the bottom panel around the inlet hole and having a height; and
   each one of the abutting ribs has
      a height lower than the height of the annular wall; and
      multiple protrusions formed on and protruding from the top side of the abutting rib at spaced intervals.

6. The insulating pot bottom as claimed in claim 5, wherein the flame guiding block has
   a guiding slot being crisscross-shaped, formed through the flat top of the conducting segment, and having a center;
   a through hole formed through the center of the guiding slot and communicating with the inlet hole; and
   at least one guiding hole formed through the conducting segment and communicating with the guiding slot.

7. The insulating pot bottom as claimed in claim 5, wherein
   a guiding slot being star-shaped, formed through the flat top of the conducting segment, and having a center;
   a through hole formed through the center of the guiding slot and communicating with the inlet hole; and
   at least one guiding hole formed through the conducting segment and communicating with the guiding slot.

8. The insulating pot bottom as claimed in claim 1, wherein the insulating pot bottom has a bottom sluice gate connected below the connecting base to selectively open or close the inlet hole of the connecting base.

9. The insulating pot bottom as claimed in claim 2, wherein the insulating pot bottom has a bottom sluice gate connected below the connecting base to selectively open or close the inlet hole of the connecting base.

10. The insulating pot bottom as claimed in claim 3, wherein the insulating pot bottom has a bottom sluice gate connected below the connecting base to selectively open or close the inlet hole of the connecting base.

11. The insulating pot bottom as claimed in claim 4, wherein the insulating pot bottom has a bottom sluice gate connected below the connecting base to selectively open or close the inlet hole of the connecting base.

12. The insulating pot bottom as claimed in claim 5, wherein the insulating pot bottom has a bottom sluice gate connected below the connecting base to selectively open or close the inlet hole of the connecting base.

13. The insulating pot bottom as claimed in claim 6, wherein the insulating pot bottom has a bottom sluice gate connected below the connecting base to selectively open or close the inlet hole of the connecting base.

14. The insulating pot bottom as claimed in claim 7, wherein the insulating pot bottom has a bottom sluice gate connected below the connecting base to selectively open or close the inlet hole of the connecting base.

15. The insulating pot bottom as claimed in claim 8, wherein the bottom sluice gate has
   a bottom frame securely connected to the connecting base below the bottom panel;
   a gate panel movably mounted between the bottom panel and the bottom frame; and
   an operating stem securely connected to the gate panel.

16. The insulating pot bottom as claimed in claim 9, wherein the bottom sluice gate has
   a bottom frame securely connected to the connecting base below the bottom panel;
   a gate panel movably mounted between the bottom panel and the bottom frame; and
   an operating stem securely connected to the gate panel.

17. The insulating pot bottom as claimed in claim 10, wherein the bottom sluice gate has
   a bottom frame securely connected to the connecting base below the bottom panel;
   a gate panel movably mounted between the bottom panel and the bottom frame; and
   an operating stem securely connected to the gate panel.

18. The insulating pot bottom as claimed in claim 11, wherein the bottom sluice gate has
   a bottom frame securely connected to the connecting base below the bottom panel;
   a gate panel movably mounted between the bottom panel and the bottom frame; and
   an operating stem securely connected to the gate panel.

19. The insulating pot bottom as claimed in claim 12, wherein the bottom sluice gate has
   a bottom frame securely connected to the connecting base below the bottom panel;
   a gate panel movably mounted between the bottom panel and the bottom frame; and
   an operating stem securely connected to the gate panel.

20. The insulating pot bottom as claimed in claim 13, wherein the bottom sluice gate has
   a bottom frame securely connected to the connecting base below the bottom panel;
   a gate panel movably mounted between the bottom panel and the bottom frame; and
   an operating stem securely connected to the gate panel.

21. The insulating pot bottom as claimed in claim 14, wherein the bottom sluice gate has
   a bottom frame securely connected to the connecting base below the bottom panel;
   a gate panel movably mounted between the bottom panel and the bottom frame; and
   an operating stem securely connected to the gate panel.

22. The insulating pot bottom as claimed in claim 15, wherein
   the bottom frame has a gate hole formed through the bottom frame and disposed around the inlet hole of the connecting base; and
   the gate panel has a limiting tab extending in the gate hole of the bottom frame.

23. The insulating pot bottom as claimed in claim 16, wherein
   the bottom frame has a gate hole formed through the bottom frame and disposed around the inlet hole of the connecting base; and
   the gate panel has a limiting tab extending in the gate hole of the bottom frame.

24. The insulating pot bottom as claimed in claim 17, wherein
   the bottom frame has a gate hole formed through the bottom frame and disposed around the inlet hole of the connecting base; and
   the gate panel has a limiting tab extending in the gate hole of the bottom frame.

25. The insulating pot bottom as claimed in claim 18, wherein
   the bottom frame has a gate hole formed through the bottom frame and disposed around the inlet hole of the connecting base; and
   the gate panel has a limiting tab extending in the gate hole of the bottom frame.

26. The insulating pot bottom as claimed in claim 19, wherein
   the bottom frame has a gate hole formed through the bottom frame and disposed around the inlet hole of the connecting base; and
   the gate panel has a limiting tab extending in the gate hole of the bottom frame.

27. The insulating pot bottom as claimed in claim 20, wherein the bottom frame has a gate hole formed through the bottom frame and disposed around the inlet hole of the connecting base; and the gate panel has a limiting tab extending in the gate hole of the bottom frame.

28. The insulating pot bottom as claimed in claim 21, wherein the bottom frame has a gate hole formed through the bottom frame and disposed around the inlet hole of the connecting base; and the gate panel has a limiting tab extending in the gate hole of the bottom frame.

\* \* \* \* \*